US008484726B1

(12) United States Patent
Sutton

(10) Patent No.: US 8,484,726 B1
(45) Date of Patent: Jul. 9, 2013

(54) KEY SECURITY INDICATORS

(75) Inventor: Michael Sutton, Reston, VA (US)

(73) Assignee: Zscaler, Inc., San Jose, CA (US)

( * ) Notice: Subject to any disclaimer, the term of this patent is extended or adjusted under 35 U.S.C. 154(b) by 777 days.

(21) Appl. No.: 12/251,237

(22) Filed: Oct. 14, 2008

(51) Int. Cl.
*G06F 11/00* (2006.01)
*G06F 12/14* (2006.01)
*G06F 12/16* (2006.01)
*G06F 15/173* (2006.01)
*G08B 23/00* (2006.01)

(52) U.S. Cl.
USPC .......................................... 726/22; 709/224

(58) Field of Classification Search
None
See application file for complete search history.

(56) References Cited

U.S. PATENT DOCUMENTS

| 6,085,243 | A | 7/2000 | Fletcher et al. |
| 7,032,022 | B1 * | 4/2006 | Shanumgam et al. ........ 709/225 |
| 7,823,185 | B1 * | 10/2010 | Seaman et al. ..................... 726/1 |
| 2006/0075504 | A1 * | 4/2006 | Liu .................................. 726/25 |
| 2008/0005780 | A1 | 1/2008 | Singleton |
| 2008/0040790 | A1 * | 2/2008 | Kuo ................................ 726/12 |
| 2008/0047016 | A1 * | 2/2008 | Spoonamore ................... 726/25 |

* cited by examiner

*Primary Examiner* — Azizul Choudhury
(74) *Attorney, Agent, or Firm* — Clements Bernard PLLC; Lawrence A. Baratta, Jr.; Christopher L. Bernard

(57) ABSTRACT

Systems, methods and apparatus for a distributed security system that provides security processing for security customers external to network edges of external systems. Each security customer is associated with one or more external systems. The security system can monitor data communications originating from or destined to the external systems and generate security-related information based on the monitored communications. For each security customer, the system can aggregate the system information from each external system associated with that customer, regardless of the geographical location of the system.

18 Claims, 4 Drawing Sheets

KEY SECURITY INDICATORS

BACKGROUND

This disclosure relates to network security.

With the prevalence and accessibility of computing systems and computer networks, many entities, e.g., business entities, utilize distributed computing environments, e.g., geographically distributed computing systems, to conduct their operations. For example, a business entity may have multiple offices at geographically diverse locations, with each office constituting a local computing environment.

Although utilizing a distributed computing environment may provide benefits to an entity, e.g., a local presence to service the entity's clientele, it also presents certain challenges. For example, with such a distributed computing environment, monitoring and recognizing security concerns, e.g., security vulnerabilities, for the entity across the distributed environment can be burdensome. Consider, for example, business entities with multiple offices typically monitor security concerns for each office locally (within that office's local computing environment) and then use push/pull synchronization techniques to upload security logs identifying or reflecting the security concerns for each office to a centralized database. However, such synchronization techniques can be slow and consume significant portions of the bandwidth available to the entity. Further, such synchronization may not be possible if the entity has employed different network access providers to provide network access for the multiple offices.

Additionally, comparing security concerns between entities can provide valuable insight into the overall security state of an entity. For example, comparing the security concerns of an entity with the security concerns of other similarly-positioned entities (e.g., entities similar in size, resources, or business verticals) can alert the entity to abnormal network activity, security vulnerabilities, etc. However, the feasibility of such comparisons is limited by, for example, the availability of security information for a collection of entities and a mechanism to facilitate the aggregation and comparison of the security information.

SUMMARY

In general, the subject matter of this application relates to generating and aggregating security reporting data for a plurality of external systems external to network edges of the external systems.

One aspect of the subject matter described in this specification can be embodied in a system having processing nodes external to network edges of external systems for security customers. Each security customer is associated with one or more external systems and each processing node includes a processing node data store and a processing node manager. The processing node data store stores security policy data defining security policies for each security customer. The processing node manager is configured to monitor data traffic originating from or destined to each external system; enforce corresponding security polices on the monitored data traffic; and for each security customer generate security reporting data including data related to the enforcement of the security policies and data traffic statistics based on the monitored data traffic. A logging node is external to the network edges of the external systems and is configured to communicate with the processing nodes. The logging node includes a logging data store and a logging node manager. The logging node manager is configured to receive the security reporting data from each processing node, aggregate the received security reporting data for each security customer, and store the aggregated security reporting data in the logging data store.

Another aspect of the subject matter described in this specification can be embodied in a method that includes providing data communication from processing nodes to external systems for security customers. Each security customer is associated with one or more of the external systems. In each processing node and for each external system provided data communication with the processing node, the method includes: accessing security policies for the external system, enforcing the security polices on the provided data communication, and generating security reporting for each security customer including data identifying security events corresponding to the enforcement of the security policies and communication statistics based on the provided data communication. The method further includes receiving, at a logging node external to the network edges external systems, the security reporting data from each processing node. For each security customer, the method includes aggregating at the logging node the received security reporting data for each external system associated with that security customer.

The details of one or more embodiments of the subject matter described in this specification are set forth in the accompanying drawings and the description below.

Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

Figure 1:
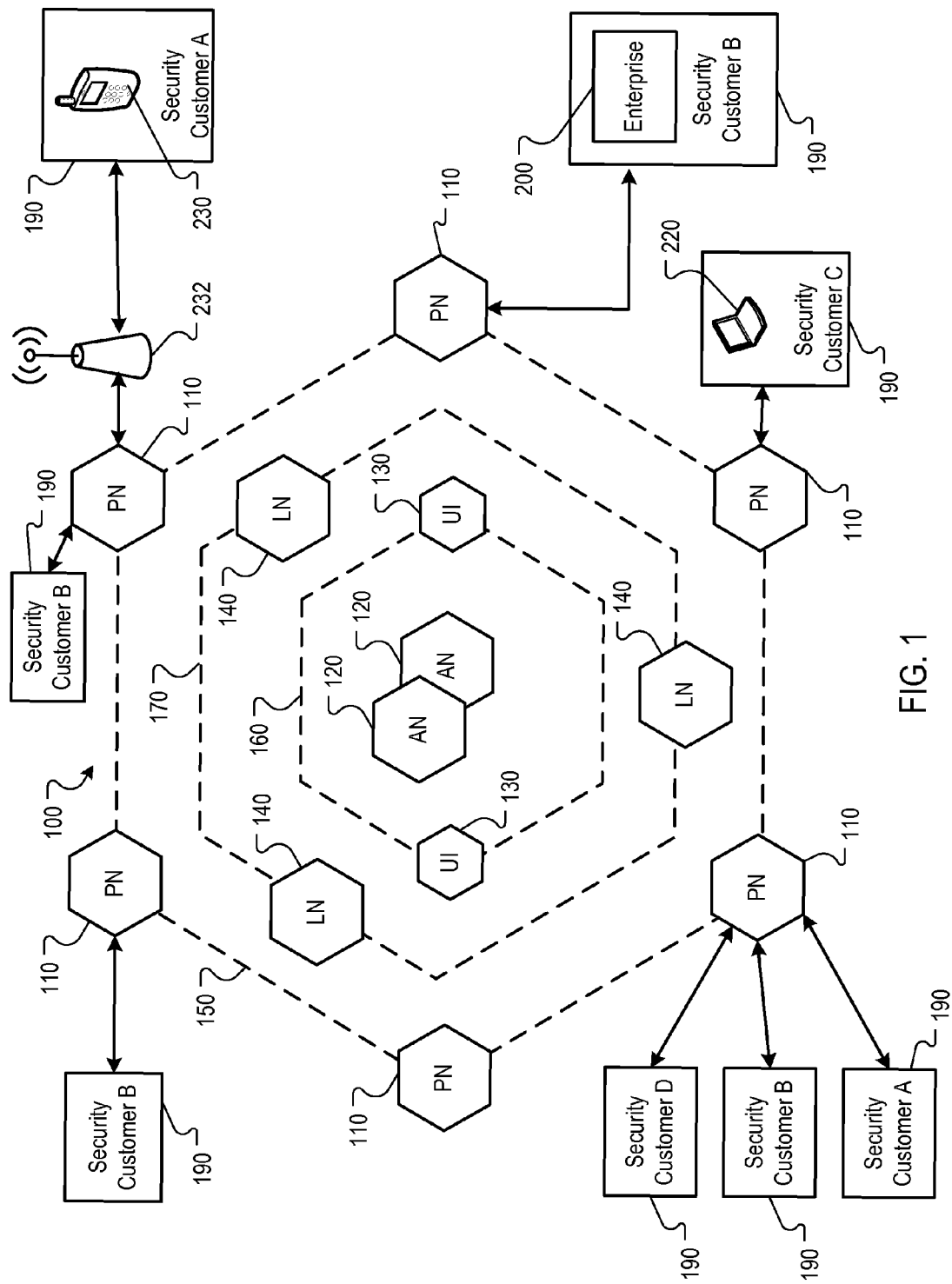
FIG. 1 is a block diagram of a distributed security system.

FIG. 1 is a block diagram of a distributed security system 100. The system 100 can, for example, be implemented as an overlay network in a wide area network (WAN), such as the Internet. Security customers 190 (e.g., businesses, individuals, organizations, etc.) can, for example, utilize the system 100 to provide security-related services for one or more external systems associated with each security customer 190. Example external systems can include an enterprise 200 (associated with security customer B), a computer device 220 (associated with security customer C), a mobile device 230 (associated with security customer A), or other network and computing systems. A security customer 190 can utilize the system 100 even if that customer's external systems are geographically dispersed. For example, the system 100 can service a security customer 190, e.g., a retail business, that has multiple external systems, e.g., computing networks, with each external system local to and supporting a business office in different geographic regions.

The system 100 includes processing nodes 110, external to network edges of the external systems, that monitor data communications/data traffic originating from or destined to the external systems, and detect and preclude the distribution of security threats, e.g., malware, spyware, and other undesirable content sent from or requested by the external systems. Based on the monitored data traffic, the detection of security threats, and/or the preclusion of security threats, the processing nodes 110 can generate security reporting information for the external systems. Such security reporting information can be used, for example, by the security customers 190 to identify security threats or vulnerabilities for the external system(s). A processing node 110 may service one or more external systems associated with one or more security customers 190, e.g., external systems for security customers A, B, and D are serviced by a single processing node 110, as illustrated by the diagrammatic representations of the external systems of security customers A, B and C being in communication with the same processing node 110. Further, one security customer 190 can be serviced by more than one processing node 110, e.g., security customers A and B are serviced by multiple processing nodes, as illustrated by the diagrammatic representations of the external systems of security customers A and B being in communication with multiple processing nodes 110.

The system 100 also includes logging nodes 140, external to network edges of the external systems, that can receive the security reporting information from the processing nodes 110 and aggregate the security reporting information from all external systems for each security customer 190.

As both the processing nodes 110 and logging nodes 140 operate outside of the local computing environments of the external systems, the system 100 is equipped to generate security reporting information for each security customer 190 to provide a view of security-related concerns across multiple external systems for that customer 190 regardless of the location or configuration of the customer's external system(s).

Further, as the system 100 can provide security services to multiple security customers 190, the logging node 140 can, for example, provide anonymized comparisons of the security reporting information between security customers 190. The comparisons can be used to gauge, or provide context for, the security-related activity or concerns for a particular security customer 190 to that of other security customers 190.

§2.0 Example High Level System Architecture

In an example implementation, each processing node 110 can include a decision system, e.g., data inspection engines that operate on a content item, e.g., a web page, a file, an e-mail message, or some other form of data communication that is sent from or destined to one of the external systems. In some implementations, all data communications destined to or received from the Internet are processed through a processing node 110. In other implementations, specific data specified by each external system, e.g., only e-mail, only executable files, etc., are processed through a processing node 110.

Each processing node 110 can generate a decision vector $D=[d1, d2, \ldots, dn]$ for a content item of one or more parts $C=[c1, c2, \ldots, cm]$. Each decision vector can identify a threat classification, e.g., clean, spyware, malware, undesirable content, innocuous, unknown, etc. For example, the output of each element of the decision vector D can be based on the output of one or more data inspection engines. In some implementations, the threat classification can be reduced to a subset of categories e.g., violating, non-violating, neutral, unknown. Based on the subset classification, a processing node 110 may allow distribution of the content item, preclude distribution of the content item, allow distribution of the content item after a cleaning process, or perform threat detection on the content item.

In some implementations, the actions taken by a processing node 110 can be determinative on the threat classification of the content item and on a security policy of the external system to which the content item is being sent from or from which the content item is being requested by. For example, a security policy may require that all violating content items be precluded from distribution. Accordingly, for external systems with such a security policy, processing nodes 110 will enforce the policy and "block" distribution of content items classified as violating. A content item is violating if, for any part $C=[c1, c2, \ldots, cm]$ of the content item, at any processing node 110, any one of the data inspection engines generates an output that results in a classification of violating. Other threat classification processes and data structures can also be used.

Processing nodes 110 can also monitor data communications sent from or destined to the external systems to generate traffic statistics (e.g., communication statistics) for the data communications to identify or describe characteristics of the data communications, or the composition of the data communications (e.g., particular types of content items). For example, a processing node 110 may track the number of requests, as a result of monitoring the data communications, from an external system to a particular URL address during a time period. Based on the number of requests, the processing node 110 can generate traffic statistics, for example, characterizing the frequency with which requests were directed to that URL address or the bandwidth consumed as a result of the requests.

Each processing node 110 can also generate security reporting data for a security customer 190 including or based on, for example, security events corresponding to the enforcement of security polices on monitored data traffic, data traffic statistics, classifications of content items, and/or other actions taken by the processing node 110.

Each processing node 110 can be implemented by a plurality of computer and communication devices, e.g., server computers, gateways, switches, etc. In some implementations, the processing nodes 110 can serve as an access layer 150. The access layer 150 can, for example, provide external system access to the security system 100. In some implementations, each processing node 110 can include Internet gateways and a plurality of server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications/data traffic can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communicate with the nearest processing node 110 through any available wireless access device 232, such as an access point, or a cellular gateway. A single computer device 220, such as a consumer's personal computer, may have its browser and e-mail program configured to access the nearest processing node 110, which, in turn, serves as a proxy for the computer device 220. Alternatively, an Internet provider may have all of its customer traffic processed through processing nodes 110.

In some implementations, the processing nodes 110 can communicate with one or more authority nodes 120. The authority nodes 120 can store policy data for each external system or for each security customer 190 and can distribute the policy data to each processing node 110. The policy data can, for example, define security policies for a protected system (e.g., security policies for the enterprise 200 or other external systems), or security policies for security customers 190. Example policy data can define access privileges for users, web sites and/or content that is disallowed, restricted domains, etc. The authority nodes 120 can distribute the policy data to the processing nodes 110.

In some implementations, the authority nodes 120 can also distribute threat data that includes the classifications of content items according to threat classifications, e.g., a list of known viruses, a list of known malware sites, spam e-mail domains, etc. The distribution of threat data between the processing nodes 110 and the authority nodes 120 can be implemented by push and pull distribution schemes.

In some implementations, each authority node 120 can be implemented by a plurality of computer and communication devices, e.g., server computers, gateways, switches, etc. In some implementations, the authority nodes 110 can serve as an application layer 160. The application layer 160 can, for example, manage and provide policy data, threat data, data inspection engines, data collection engines, and dictionaries for the processing nodes.

Other application layer functions can also be provided in the application layer 160, such as a user interface front-end 130. The user interface front-end 130 provides a user interface through which administrative users of the external systems can provide and define security policies, e.g., whether e-mail traffic is to be monitored, whether certain web sites are to be precluded, etc.

Another application capability that can be provided through the user interface front-end 130 is security analysis and log reporting. The underlying data on which the security analysis and log reporting functions operate are stored in logging nodes 140, which serve as a data logging layer 170. Each logging node 140 can store data related to security operations and network data traffic processed by the processing nodes 110 for each external system.

The logging nodes 140 can communicate with the processing nodes 110 to receive the security reporting data for the security customers 190. The logging nodes 140 can, for example, aggregate the security reporting data from all processing nodes 110 for each security customer 190 and store the aggregated data. In some implementations, the logging nodes 140 can, for example, compare sets or subsets of security reporting data associated with various security customers 190 according to various security customer characteristics, e.g., size, geographic location, etc.

The data processing by the logging node 140 can, for example, be anonymized so that data identifying an external system or security customer 190 is removed or obfuscated. For example, identifying data can be removed to provide a summary or comparison of security reporting data for any or all security customers 190 or any or all external systems without revealing the identity of any one customer 190 or system. In another example, identifying data can be obfuscated, e.g., provide a random account number each time a system is accessed, so that security reporting data for all security customers 190 and all external systems can be broken out by accounts without revealing the identity of any one account. In other implementations, the identifying data and/or data processed or stored by the logging node 140 can be further encrypted, e.g., so that only the security customer 190 or those authorized by the security customer 190 can access the security reporting data for that customer 190. Other processes of anonymizing, obfuscating, or securing data stored or processed by the logging node 140 can also be used.

In some implementations, the processing node 110 may act as a forward proxy that receives user requests to external servers addressed directly to the processing node 110. In other implementations, the processing node 110 may access user requests that are passed through processing node 110 in the transparent mode. A protected system, e.g., enterprise 200, can, for example, choose one or both of these modes.

In another example, an enterprise gateway can be configured so that user requests are routed through the processing node 110 by establishing a communication tunnel between enterprise gateway and the processing node. For establishing the tunnel, existing protocols such as generic routing encapsulation (GRE), layer two tunneling protocol (L2TP), IP security protocol (IPSec), or other security protocols may be used.

In another example, the processing nodes 110 can be deployed at Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected.

In another transparent proxy mode example, a protected system, such as the enterprise 200, may identify a processing node 110 as a next hop router for communication with the external servers.

§3.0 Example Detailed System Architecture and Operation

Figure 2:
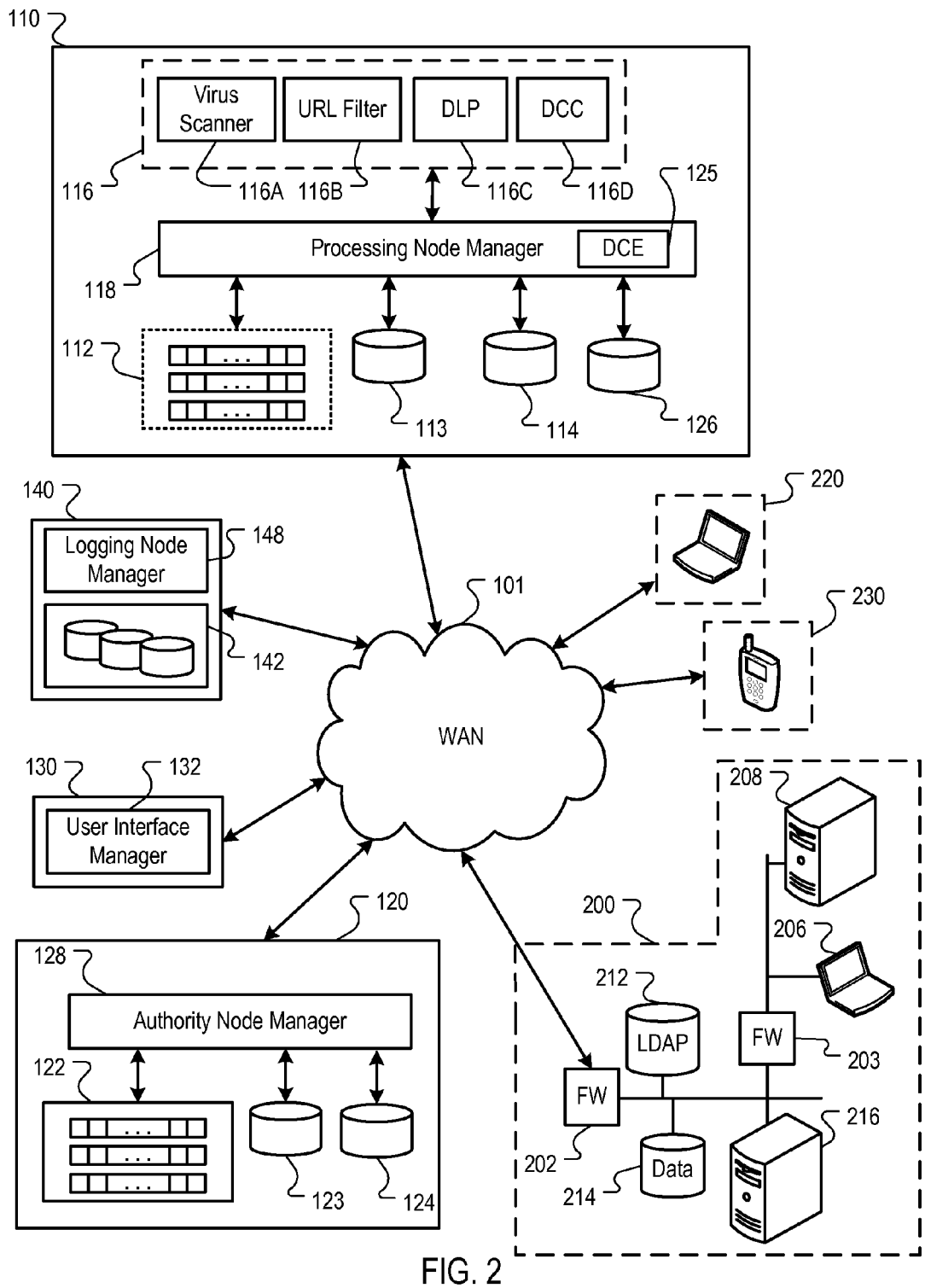
FIG. 2 is a block diagram of the system of FIG. 1 in which the components of FIG. 1 are illustrated in more detail.

FIG. 2 is a block diagram of the system of FIG. 1 in which the components of FIG. 1 are illustrated in more detail. Although only one representative component processing node 110, authority node 120 and logging node 140 are illustrated, there can be many of each of the component nodes 110, 120 and 140 present in the system 100.

A wide area network (WAN) 101, such as the Internet, or some other combination of wired and/or wireless networks, connects in data communication the processing node 110, authority node 120 and logging node 140 (collectively "network security system"). The external systems 200, 220 and 230 likewise communicate over the WAN 101 with each other or other data providers and publishers. Some or all of the data communication of each of the external systems 200, 220 and 230 can be processed through the processing node 110.

FIG. 2 also shows the enterprise 200 in more detail. The enterprise 200 can, for example, include a firewall 202 protecting an internal network that can include one or more enterprise servers 216, a lightweight director access protocol (LDAP) server 212, and other data or data stores 214. Another firewall 203 can protect an enterprise subnet that can include user computers 206 and 208 (e.g., laptop and desktop computers). The enterprise 200 may communicate with the WAN 101 through one or more network devices, such as a router, gateway, etc. The LDAP server 212 may store, for example, user login credentials for registered users of the enterprise 200 system. Such credentials can include user identifiers, login passwords, and a login history associated with each user identifier. The other data 214 can include sensitive information, such as bank records, medical records, trade secret information, or any other information warranting protection by one or more security measures.

The computer device 220 and the mobile device 230 can also store information warranting security measures, such as personal bank records, medical information, and login information, e.g., login information to the server 216 of the enterprise 200, or to some other secured data provider server.

§3.1 Example Processing Node Architecture

In some implementations, the processing nodes 110 are external to network edges of the external systems 200, 220 and 230. Each processing node 110 stores security policies 113 (e.g., for individual external systems or individual security customers 190) received from the authority node 120, and monitors and manages data communications, e.g., content items, originating from or destined to the external systems. In some implementations, each processing node 110 can also store a detection process filter 112 and/or threat data 114 to facilitate the decision of whether a content item should be processed for threat detection.

Each processing node 110 can include a processing node manager 118 that can generate security reporting data 126. Security reporting data 126 can include, for example, data related to security policy enforcement events and data traffic statistics. Security policy enforcement events identify applications or enforcement of security policies on data communications, e.g., content items. Generally, data traffic statistics provide quantifications or other descriptions of network activity associated with the monitored data communications. The security reporting data 126 can be used, for example, by the security customers 190 to assess the security of the external systems.

A processing node manager 118 can manage, for example, data communications in accordance with the security policy data 113, and the detection process filter 112 and/or threat data 114. Such management permits security policies for a plurality of external systems to be implemented, e.g., enforced, external to the network edges for each of the external systems 200, 220 and 230. For example, based on the classification resulting from the monitoring of a content item, the processing node manager 118 can enforce a security policy on the content item and, depending on the classification and the security policy, the content item may be allowed, precluded, or threat detected. As such, a security policy may, for example, require that all e-mail traffic be monitored and, further, that e-mails associated with restricted e-mail accounts be blocked. Thus if a content item is classified as an email then the corresponding security policy is enforced (regardless of whether the enforcement results in the content item being blocked, allowed, or threat detected). If the e-mail is associated with one of the restricted accounts then the processing node manager 118 can block the e-mail.

In general, content items that are already classified as "clean" or not posing a threat can be allowed, while those classified as "violating" can be precluded. Those content items having an unknown status, e.g., content items that have not been processed by the system 100, can be threat detected to classify the content item according to threat classifications.

The processing node 110 can include data inspection engines 116. Each data inspection engine 116 can be configured to perform a threat detection process to classify content items in a data communication according to a threat classification for a corresponding threat. For example, the data inspection engines 116 can include a virus scanner engine 116A that can classify a content item as infected or clean, a network URL filter 116B that can classify a URL address as allowed or restricted, a data leakage protection (DLP) engine 116C that can identify a content item as secure or leaking, and a dynamic content categorization (DCC) engine 116D that can classify a content item as passed or failed. For example, a security policy may require that all content items classified as infected, e.g., as determined by the virus scanner engine 116A, be blocked. As such, if an executable file requested by an external system is classified as infected then in accord with the security policy, the processing node manager 118 can enforce the security policy and block the executable file before it reaches the requesting external system.

The list of the data inspection engines 116A-116D is illustrative only; many other data inspection engines 116 can also be used, as can multiple instances of data inspection engines, e.g., different type data leakage engines implementing different data leakage algorithms. The calling of any particular data inspection engine 116 can be predicated on the type of content item to be threat detected. For example, a URL request from the enterprise 200 may cause the processing node manager 118 to call only the URL filter engine 116B.

In some implementations, the processing node manager 118 can also generate the data traffic statistics based on the monitoring and management of the data communications. The data traffic statistics can, for example, include information related to the volume of the data communications (e.g., bandwidth) resulting from network activity associated with particular software applications, domains, computing systems, web browsers/web browser versions or configurations, external systems, security customers 190, sources known to be associated with a botnet, known phishing sources, malware, etc. The data traffic statistics can also include, for example, the types and corresponding numbers/frequency of classified content items and the frequency with which data communications are determined to be secure or leaking.

For example, from the data traffic statistics and the security policy enforcements events, the processing node manager 118 can generate security reporting data 126 that includes, for example, malware detection data identifying security events (or security policy enforcement events) corresponding to the enforcement of the security policies on monitored data communications associated with malware content. The malware content may include both known malicious code such as viruses, worms, Trojan Horses, keyloggers, and malicious code that has not previously been encountered but can be identified through a variety of heuristic methods. The malware content may be identified and classified by, for example, the data inspection engines 116 or the threat data 114.

Security action data can also be included in the security reporting data 126. Security action data identify whether the monitored data communication is prohibited or permitted (i.e., blocked or allowed) based on the enforcement of the security policies. Thus, for example, when a security policy is enforced, the security action data identify whether a content item subject to the enforcement was allowed, blocked, threat detected, or otherwise managed.

Security reporting data 126 can also include domain detection data identifying security events corresponding to the enforcement of the security policies on monitored data traffic associated with particular domains. For example, a security policy may require that all URL requests be monitored and that requests to certain URL addresses be blocked. Thus the security reporting data 126 can, for example, identify requests directed to specific URL addresses and security events resulting from the requests, e.g., blocking the request(s).

Security reporting data 126 can also include software control data identifying security events that correspond to the enforcement of security policies on monitored data communications associated with one or more identified software programs. For example, a security policy may require that data communications originating from or requested by specific software programs, e.g., an instant messaging program, be monitored and, optionally, if associated with one specific software program, e.g., a particular instant messaging application, be blocked, allowed, or otherwise managed. Thus the security reporting data 126 can, for example, include security events associated with allowing data communications generated by a particular instant messaging program.

The security reporting data 126 can also include network address data and/or geographic data identifying computing systems (or external systems) and the geographic location of the computing system (or the external system), respectively, from which the monitored data communication originated or to which the monitored data communication is destined. For example, the security reporting data 126 may include a network identification of a computing system, e.g., an IP address, and corresponding geographic location of the system originating a request for a webpage.

Directional data identifying whether the monitored data communication originated from or was destined to the external systems can also be included in the security reporting data 126. For example, the security reporting data 126 may identify that a particular content item was "inbound" or "outbound" traffic with respect to an external system. The directional data may also identify the volume of all inbound and/or outbound traffic for each external system or security customer 190, or for all external systems or security customers 190.

In addition, the security reporting data 126 can include time data identifying time periods in which data traffic was monitored. For example, time data can identify a first time period corresponding to data communications that were monitored between March 1st and March 15th.

The above examples of security reporting data 126 are not exhaustive. Other information can be stored in the security reporting data 126, depending on the type of security policies enforced and the security system capabilities.

In some implementations, the processing node manager 118 can include a data collection engine 125 that generates the security reporting data 126. Further, in other implementations, the processing node 110 can include a data collection engine 125 external to the processing node manager 118 thereby permitting the security reporting data 126 to be generated external to the processing node manager 118.

§3.2 Example Authority Node Architecture

In general, the authority node 120 includes a data store that stores master security policy data 123 for each of the external systems 200, 220 and 230. An authority node manager 128 can be used to manage the master security policy data 123, e.g., receive input from users of each of the external systems defining different security policies, and can distribute the master security policy data 123 to each of the processing nodes 110. The processing nodes 110 then store a local copy of the security policy data 113.

The authority node 120 can also store master threat data 124. The master threat data 124 can classify content items by threat classifications, e.g., a list of known viruses, a list of known malware sites, spam e-mail domains, etc. The authority node manager 128 can be used to manage the master threat data 124, e.g., receive updates from a processing nodes 110 when a processing node 110 has processed a content item and update the master threat data 124 with any pertinent results. In some implementations, the master threat data 124 can be distributed to the processing nodes 110, which then store a local copy of the threat data 114.

In some implementations, the authority node 120 can also monitor the health of each processing node 110, e.g., the resource availability in each processing node 110, detection of link failures, etc. Based on the observed health of each process node 110, the authority node 120 can redirect traffic among processing nodes 110 and/or balance traffic among the processing nodes 110. Other remedial actions and processes can also be facilitated by the authority node 120.

§3.3 Example Logging Node Architecture

In general, the logging nodes 140 are external to the network edges of the plurality of external systems and can communicate with the processing nodes 110.

Each logging node includes, for example, a logging node data store 142 and a logging node manager 148. In some implementations, each logging node can be responsible for aggregating security data for one or more customers of the security system. For example, with reference to FIG. 1, Security Customer B has a distributed external system that communicates through four processing nodes 110. Thus, a particular logging node 140 communicates with those four processing nodes 110 and aggregates the security data for Security Customer B.

To accomplish this, the logging node manager 148 can receive security reporting data 126 from the one or more processing nodes 110. The logging node manager 148 can, for example, aggregate the security reporting data 126 received from all processing nodes 110 for each security customer 190 and store the aggregated security reporting data 126 in the logging node data store 142. Thus if a security customer 190 is associated with two external systems and each external system communicates with a distinct processing node 110 then the logging node manager 148 can aggregate the security reporting data 126 for the customer 190 from the two distinct processing nodes 110. As such, even if the two external systems are located in geographical diverse locations, the logging node manager 148 can, nonetheless, consolidate the security reporting data 126 for both external systems.

In some implementations, the logging node manager 148 can partition the security reporting data 126 according to one or more specified degrees of granularity. For example, the logging node manager 148 can partition the security reporting data 126 based on one or combinations of any of the data comprising the security reporting data 126 discussed above in §3.1; e.g., security action data, malware detection data, directional data, data communications associated with a particular computing system, etc. Such partitioning can be accomplished using common data management techniques.

For example, the logging node manger 148 can partition the aggregated security reporting data 126 for a security customer 190 based on geographic data and malware detection data. As such, for the geographic location identified by the geographic data, e.g., a region including numerous external systems associated with that security customer, the logging node manager 148 can partition the security reporting data 126 based on the security events caused by detected malware content for the external systems within the identified geographic region/location. Thus the logging node manager 148 can partition the security reporting data 126 to present only malware related security events occurring at the identified geographic location, e.g., in the form of a graphical chart.

The logging node manager 148 can also compare security reporting data 126 and/or subsets of the security reporting data (e.g., partitioned security reporting data), for the same security customer 190 or between security customers 190. For example, a logging node manager 148 can compare the number and type of security events for a first external system (or first computing system, e.g., an office in the San Jose, Calif. area) associated with a security customer 190 with the number and type of security events for a second external system (or second computing system, e.g., an office in the Atlanta, Ga., area) associated with the same security customer 190. In another example, the logging node manager 148 can compare the volume of data communications for a first security customer 190 during a specific period with the volume of communications for a second security customer 190 during the same specified period. The logging node manager 148 may present the results of the comparison (or any other logging node manager 148 activity) in textual or graphical forms.

Each security customer 190 may have customer characteristics identifying or describing operating characteristics of that customer 190. For example, each security customer 190 can be associated with an industry/business vertical, e.g., real estate, financial services, legal, charitable services, etc.; and/or customer size identifying the number of employees or staff associated with the customer 190; or other characteristics such as geographic location or volume of data communications.

In some implementations, the logging node manager 148 can access or is provided customer characteristic information from which the logging node manager 148 can base comparisons, e.g., from a third party or from the security customers 190. For example, the logging node manager 148 can compare security reporting data 126 for security customers 190 based on industry vertical, e.g., compare security reporting data 126 between security customers 190 in the financial services industry. These comparisons can be provided to the customers 190 in anonymized form. For example, a first customer 190 can be presented with a comparison of key security statistics relative to other customers 190 in the first customer's vertical. However, the identity of the other customers is anonymized. Furthermore, each customer can be provided with the option to "opt-in" to (or, alternatively, "opt-out" of) allowing its associated data being used in such comparisons.

In another example, the logging node manager 148 can compare security reporting data 126 for security customers 190 based on the customer size, e.g., compare security reporting data 126 between security customers 190 having a similar number of employees.

The logging node manager 148 can also provide trending data, e.g., data including information related to comparisons of security reporting data 126 over time. For example, the logging node manager 148 can compare security reporting data 126 resultant from data communications monitored during different time periods, e.g. as partitioned according to time data. As such, the logging node manager 148 can compare security reporting data 126 associated with a first time period with security reporting data 126 associated with a second time period to identify trends in the security reporting data from the first time period to the second time period, e.g., to identify an increase or decrease in the bandwidth consumed. The trending data can be based on security reporting data 126 from one or more security customers 190.

In some implementations, the logging node manager 148 can normalize the security reporting data 126 on which the comparisons are based. For example, if security customer A has 5000 employees and security customer B has 100 employees, direct comparisons between the security reporting data 126 from customers A and B may indicate security customer A experiences fifty times the number of security events as security customer B. However, the disparity is likely attributable to the difference in employee base (customer size). Thus, for example, to provide a more meaningful comparison the logging node manager 148 can normalize the security reporting data 126 according to customer size (or any other customer characteristic) e.g., normalize the security reporting data for security customers A and B based on a customer size of 2500 employees.

Figure 4:
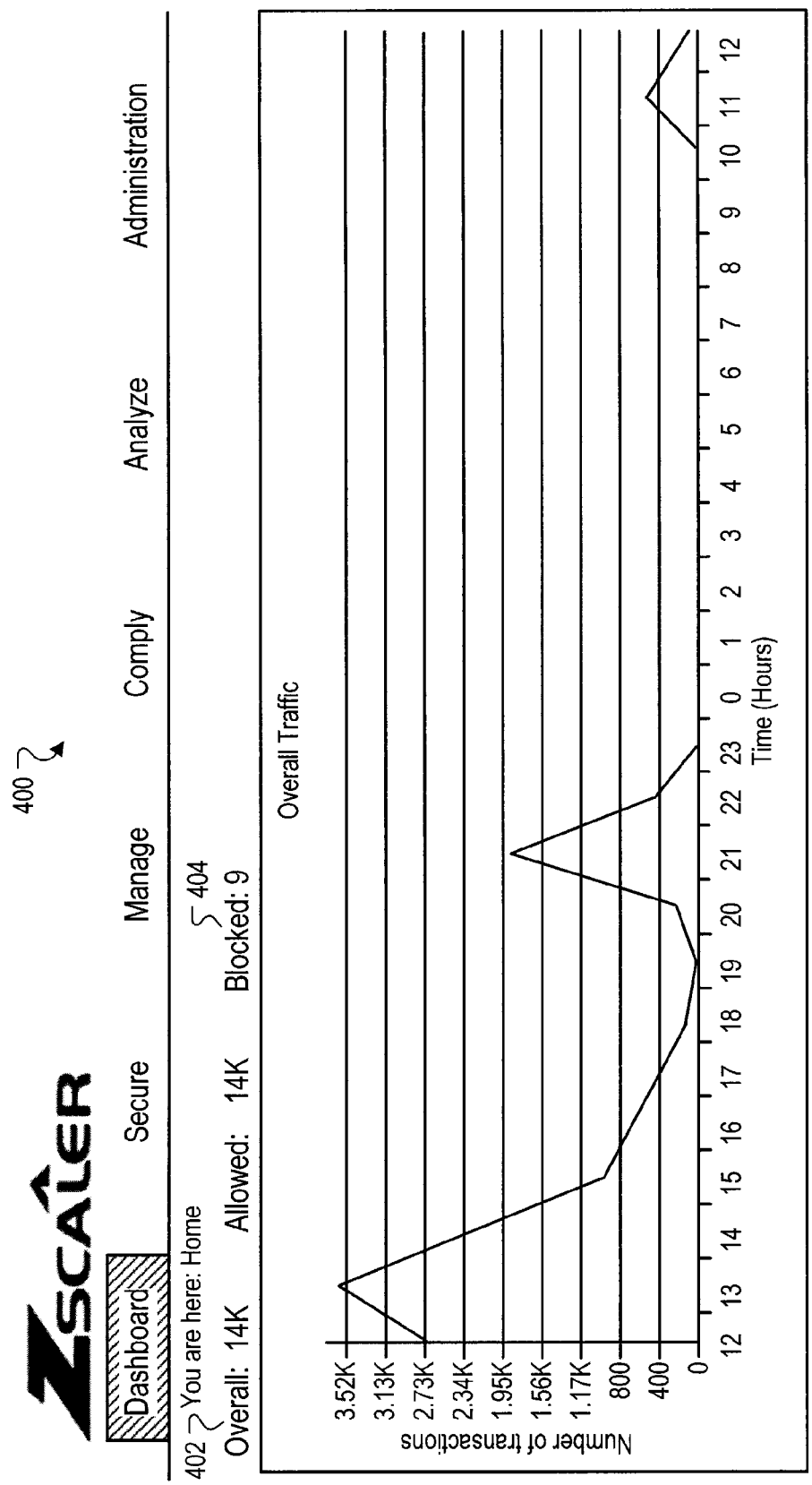
FIG. 4 is a chart screen shot graphically representing example security reporting data for a security customer.

FIG. 4 is a chart screen shot 400 graphically representing example security reporting data 126 for a security customer 190. For example, the logging node manager 148 may generate data that can be rendered on a client device to display the chart screen shot 400. Example data can include HTML data. The chart screen shot 400 illustrates the volume of data traffic originating from or destined to one or more external systems associated with a particular security customer 190 during a twenty-four hour period. The example security reporting data 126 (on which the chart screen shot 400 is based) indicates that the external systems were responsible for approximately fourteen-thousand transactions (e.g., requests and responses) 402. The number of transactions can be determined or retrieved, for example, from the data traffic statistics. Although chart 400 illustrates the security reporting data 126 in terms of transactions, the security reporting data 126 can also be monitored and/or illustrated in terms of other units of measurement, e.g., bytes, etc.

The example security reporting data 126 also indicate through chart 400 that nine transactions 404 were blocked during the reporting period. The number of transactions that were blocked (or allowed or threat detected) can be determined from, for example, security events resulting from enforcement (or non-enforcement) of the security polices 113 on the monitored data traffic.

3.4 Example Processing Node, Logging Node and Authority Node Communications

The processing node 110, authority node 120 and logging node 140 can be configured according to one or more push and pull processes to manage content items according to security policy data 113 and/or 123 and the threat data 114 and/or 124, and the resulting security reporting data 126 generated during processing.

§4.0 Example Processes for Providing Distributed Security Provisioning

Figure 3:
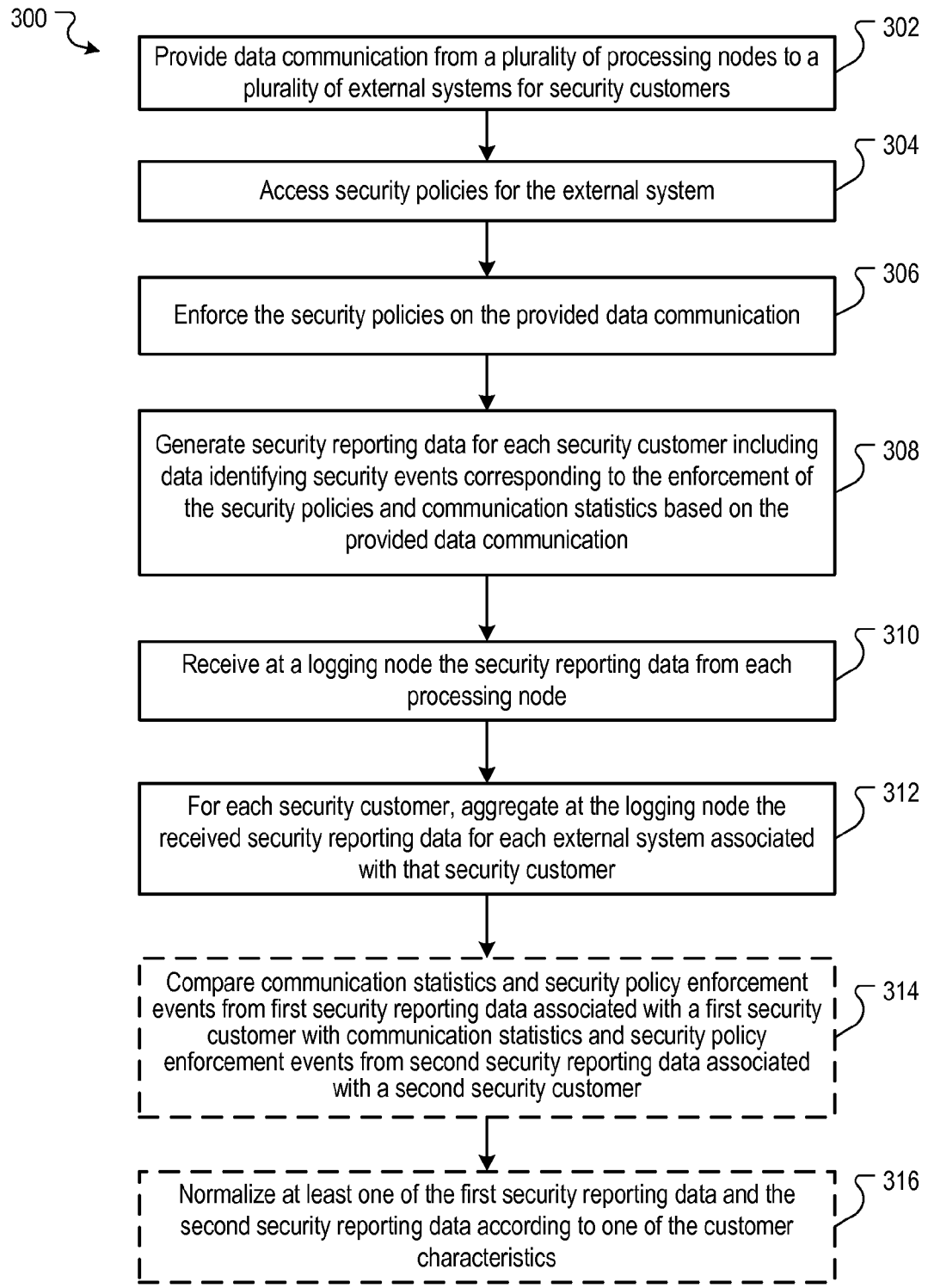
FIG. 3 is a flow diagram of an example process for providing security reporting data.

FIG. 3 is a flow diagram of an example process 300 for providing security reporting data. The process 300 can, for example, be implemented in the system 100 of FIG. 1, or in other security systems having a distributed architecture.

Data communication is provided from a plurality of processing nodes to a plurality of external systems for security customers (302). For example, the processing nodes 110 can be used to establish data communication with the external systems 200, 220 and 230.

Security polices for the external system are accessed (304). For example, the processing nodes 110 can access security polices 113 received from the authority node 120.

Security polices are enforced on the provided data communication (306). For example, the processing node 110 can enforce security policies on the provided communications by managing the content items according to the threat classifications of the content items and the security policies of the external systems.

Security reporting data for each security customer including data identifying security events corresponding to the enforcement of the security polices and communication statistics based on the provided data communication are generated (308). For example, the data collection engine 125 can generate security reporting data 126 from information related to the enforcement of the security polices and the data traffic statistics (e.g., communication statistics).

The security reporting data from each processing node is received at a logging node (310). For example, the logging node manager 148 can receive the security reporting data 126 from each of the processing nodes 110 for a corresponding security customer 190. The logging node 140 can be external to the network edges of the plurality of external systems.

For each security customer, the received security reporting data for each external system associated with that security customer can be aggregated at the logging node (312). For example, the logging node manager 148 can, for each security customer 190, aggregate at the logging node 140 the received security reporting data 126 for each external system associated with that security customer 190.

Optionally, communication statistics and security policy enforcement events from first security reporting data associated with a first security customer and communication statistics and security policy enforcement events from second security reporting data associated with a second security customer can be compared (314). For example, the logging node manager 148 can compare data traffic statistics and security policy enforcement events from first security reporting data 126 associated with a first security customer 190 and data traffic statistics and security policy enforcement events from second security reporting data 126 associated with a second security customer 190. The comparison (314) can be based on, for example, the customer sizes or industry verticals of the first and second security customers 190.

At least one of first security reporting data associated with a first security customer or second security reporting data associated with a second security customer can be normalized according to one of the customer characteristics (316). For example, the logging node manager 148 can normalize at least one of first security reporting data 126 associated with a first security customer 190 or second security reporting data 126 associated with a second security customer 190 according to one of the customer characteristics, e.g., customer size.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A network security system, comprising:
    a plurality of processing nodes external to network edges of a plurality of external systems for security customers, wherein each security customer is associated with one of a plurality of industry verticals, wherein each security customer is connected to an associated processing node over the Internet via a tunnel, a transparent proxy, a forward proxy, or redirection to the associated processing node such that all traffic to and from the security customer traverses the processing node, each security customer being associated with one or more external systems, each security customer is communicatively coupled to one of the plurality of processing nodes, and each processing node comprising:
        a processing node data store storing security policy data defining security policies for each security customer;
        a processing node manager comprising a processor configured to:
            monitor and perform a threat classification on all data traffic originating from or destined to each external system, wherein the threat classification relates to viruses, malware, data leakage to the external system, and web site filtering;
            enforce corresponding security policies on the monitored data traffic; and
            for each security customer, generate security reporting data including data related to the enforcement of the security policies and data traffic statistics based on the monitored data traffic; and
    a logging node external to the network edges of the plurality of external systems and configured to communicate with the processing nodes, wherein the logging node includes a logging data store and a logging node manager comprising a processor configured to:
        receive the security reporting data from each processing node;
        aggregate the received security reporting data for each security customer; and
        store the aggregated security reporting data in the logging data store;
    wherein the logging node manager is configured to compare the aggregated security reporting data based on industry vertical.

2. The system of claim 1, wherein:
the security reporting data comprises malware detection data identifying security events corresponding to the enforcement of the security policies on monitored data traffic associated with malware content.

3. The system of claim 1, wherein:
the security reporting data comprises domain detection data identifying security events corresponding to the enforcement of the security policies on monitored data traffic associated with particular domains.

4. The system of claim 1, wherein:
the security reporting data comprises software control data identifying security events corresponding to the enforcement of the security policies on monitored data traffic associated with one or more identified software programs.

5. The system of claim 1, wherein:
the security reporting data comprises network address data identifying computing systems from which the monitored data traffic originated or to which the monitored data traffic was destined, each computing system associated with one of the external systems.

6. The system of claim 1, wherein:
the security reporting data comprises geographic data identifying geographic locations of external systems from which the monitored data traffic originated or to which the monitored data traffic was destined.

7. The system of claim 6, wherein:
the logging node manager is configured to partition the aggregated security reporting data based on geographic locations identified by the geographic data.

8. The system of claim 1, wherein:
the security reporting data include traffic directional data identifying whether the monitored data traffic originated from or was destined to the external systems.

9. The system of claim 1, wherein:
the security reporting data comprises time data identifying a first time period in which the data traffic was monitored and a second time period in which the data traffic was monitored; and
the logging node manager is configured to partition the aggregated security reporting data according to the first time period and the second time period, and to identify trends in the security reporting data from the first time period to the second time period.

10. The system of claim 1, wherein:
a first security customer is associated with a first organization with first security reporting data comprising security events corresponding to the enforcement of the security policies for the first organization;
a second security customer is associated with a second organization different from the first organization and having a separate external network therefrom and with second security reporting data comprising security events corresponding to the enforcement of the security policies for the second organization; and the logging node manager is configured to compare the security events from the first security reporting data with the security events from the second security reporting data via normalization based on relative sizes of the first organization and the second organization.

11. The system of claim 1, wherein:

the security reporting data comprises security action data identifying whether the monitored data traffic was prohibited or permitted based on the enforcement of the security policies.

12. The system of claim 1, further comprising:

one or more authority nodes communicatively coupled to the plurality of processing nodes and the logging node, each of the authority nodes are separate from each of the processing nodes, each authority node comprising a processor configured to:

communicate with the plurality of processing nodes and the logging node using push and pull distribution schemes;

define the security policies for the plurality of processing nodes responsive to updates from the push and pull distribution schemes.

13. The system of claim 12, wherein:

each processing node further comprising a plurality of data inspection engines to perform the threat classification, the plurality of data inspection engines comprise a virus scanning engine, a uniform resource locator filter, a data leakage protection engine, and a dynamic content categorization engine.

14. A computer-implemented method, comprising:

providing data communication from a plurality of processing nodes to a plurality of external systems for security customers, wherein each security customer is associated with one of a plurality of industry verticals, wherein each security customer is connected to an associated processing node over the Internet via a tunnel, a transparent proxy, a forward proxy, or redirection to the associated processing node such that all traffic to and from the security customer traverses the processing node, each security customer is communicatively coupled to one of the plurality of processing nodes, each security customer associated with one or more of the external systems, wherein the processing nodes are external to network edges of the plurality of external systems, and in each processing node:

for each external system provided data communication with the processing node:

accessing security policies for the external system;

enforcing the security policies on the provided data communication through monitoring and performing a threat classification on all data traffic originating from or destined to each external system, wherein the threat classification relates to viruses, malware, data leakage to the external system, and web site filtering; and generating security reporting data for each security customer including data identifying security events corresponding to the enforcement of the security policies and communication statistics based on the provided data communication; and receiving at a logging node external to the network edges of the plurality of external systems the security reporting data from each processing node; and for each security customer, aggregating at the logging node the received security reporting data for each external system associated with that security customer;

wherein the logging node is configured to compare the aggregated security reporting data based on industry vertical.

15. The method of claim 14, further comprising:

comparing communication statistics and security policy enforcement events from first security reporting data associated with a first security customer from a first organization with communication statistics and security policy enforcement events from second security reporting data associated with a second security customer from a second organization different from the first organization and having a separate external network therefrom.

16. The method of claim 15, wherein:

the first security customer has a security customer size identifying a number of security customer employees associated with the first security customer;

the second security customer has a security customer size identifying a number of security customer employees associated with the second security customer; and the comparison is based on normalization based on the security customer size of the first organization and the second organization.

17. The method of claim 15, wherein each of the first security customer and the second security customer has customer characteristics identifying operating characteristics of the security customer, the method further comprising:

normalizing at least one of the first security reporting data and the second security reporting data according to one of the customer characteristics.

18. A system, comprising:

a network security system external to network edges of a plurality of external systems for security customers, each security customer is communicatively coupled to the network security system, wherein each security customer is associated with one of a plurality of industry verticals, wherein each security customer is connected to an associated processing node over the Internet via a tunnel, a transparent proxy, a forward proxy, or redirection to the associated processing node such that all traffic to and from the security customer traverses the processing node, each security customer associated with one or more of the external systems from different organizations; and software stored on a non-transitory computer readable medium comprising instructions executable by the network security system and upon such execution cause the network security system to perform operations comprising:

monitor and perform a threat classification on all data communication originating from or destined to the external systems, wherein the threat classification relates to viruses, malware, data leakage to the external system, and web site filtering;

access security policies for the external systems;

enforce the security policies on the monitored data communication;

for each security customer, generate security reporting data including communication statistics based on the monitored data communication;

for each security customer, aggregate the security reporting data for each external system associated with that security customer, wherein the aggregated security reporting data is compared based on industry vertical; and normalize security data for all security customers for the different organizations to provide comparisons based on relative size.

\* \* \* \* \*